(12) United States Patent
Brewer et al.

(10) Patent No.: US 7,747,269 B2
(45) Date of Patent: Jun. 29, 2010

(54) SYSTEM AND METHOD FOR PROVIDING COMMUNICATION RESOURCES TO WIRELESS DISPATCH PRIORITY USERS

(75) Inventors: Beth Ann Brewer, Canyon Lake, TX (US); Arulmozhi Kasi Ananthanarayanan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 857 days.

(21) Appl. No.: 11/364,149

(22) Filed: Feb. 27, 2006

(65) Prior Publication Data

US 2007/0202910 A1 Aug. 30, 2007

(51) Int. Cl.
*H04B 7/00* (2006.01)
(52) U.S. Cl. .................. 455/518; 455/519; 455/521
(58) Field of Classification Search ............... 455/512, 455/517–521; 709/207
See application file for complete search history.

(56) References Cited

U.S. PATENT DOCUMENTS

| | | | | |
|---|---|---|---|---|
| 6,067,457 | A * | 5/2000 | Erickson et al. | 455/512 |
| 6,167,252 | A * | 12/2000 | Cohen | 455/410 |
| 6,781,963 | B2 | 8/2004 | Crockett et al. | |
| 6,970,926 | B1 * | 11/2005 | Needham et al. | 709/225 |
| 2007/0004438 | A1 * | 1/2007 | Brusilovsky et al. | 455/518 |
| 2007/0197249 | A1 * | 8/2007 | Ross et al. | 455/518 |

FOREIGN PATENT DOCUMENTS

| | | |
|---|---|---|
| WO | 0145330 | 6/2001 |
| WO | 2005112488 | 11/2005 |

OTHER PUBLICATIONS

OMA-AD_PoC-V2_0-20060224-D; "Push to Talk Over Cellular (PoC)-Architecture," Open Mobile Alliance Ltd., Draft Version 2.0, pp. 1-218, XP-002462873.
International Search Report-PCT/US2007/062912, International Searching Authority-European Patent Office-Jan. 11, 2008.
Written Opinion-PCT/US2007/062912, International Searching Authority-European Patent Office-Jan. 11, 2008.
International Preliminary Report on Patentability-PCT/US2007/062912, International Preliminary Examining Authority-European Patent Office-Aug. 29, 2008.

* cited by examiner

*Primary Examiner*—Raymond S Dean
(74) *Attorney, Agent, or Firm*—Raphael Freiwirth

(57) ABSTRACT

A wireless push-to-talk (PTT) communication system 100 assigns a special dispatch priority to for emergency communications to and from police, fire dept. or communications to other emergency personnel. A communication which has been assigned dispatch priority takes precedence over all other non-dispatch priority communications for initially completing the call and maintaining the communications links. An indication of dispatch priority in a 1xEV-DO system may be achieved by setting a bit in the RequestReason field 604 of the ConnectionRequest message 602.

47 Claims, 6 Drawing Sheets

SYSTEM AND METHOD FOR PROVIDING COMMUNICATION RESOURCES TO WIRELESS DISPATCH PRIORITY USERS

BACKGROUND

1. Field

The present invention relates generally to the field of wireless telecommunications, and more specifically relates to establishing priority for a wireless data communication.

2. Background

The demand continues to increase for wireless services including wireless telephony, the wireless transmission of multimedia, wireless e-mailing, Internet access, video streaming, image transmission, and interactive gaming. While a number of systems are in place already, new wireless technologies are being developed to satisfy the growing demand for high speed wireless Internet services. These wireless technologies include, for example, CDMA2000 1xEV-DV, 1xEV-DO, and WCDMA (wide-band Code-Division Multiple Access) which may be used in various forms of voice and data communications. These and other wireless technologies may be used to implement Push-to-Talk (PTT) direct radio voice communication services using various known protocols and specifications.

PTT communications are sometimes known as dispatch communications or "walkie talkie" mode. One advantageous feature of PTT is that a user can communicate with others without dialing an outgoing telephone number. A mobile PTT user may speak with another PTT user, or with a predefined group of other PTT users, by simply pushing a talk button. In current PTT implementations the predefined group of PTT users may include up to one hundred people participating in the same conversation, and possibly more in the future. When making a PTT call a user depresses a button to speak, and all members of the group receive the message. If one of the members of the group responds, all members of the group hear the response. In this way a group of people—say, constructions workers or taxi cab drivers—may carry on a conversation in which all members of the group hear all parts of the conversation. PTT services operate using half-duplex communications, with one channel being used for both in-bound and out-bound communication. Unlike ordinary telephone conversations in which a user may receive and transmit simultaneously, a PTT caller can only transmit or else receive at one given time, but not both at the same time.

A drawback of these and other wireless systems is that they occasionally drop calls or fail to complete new calls, especially during peak usage times or in highly congested areas. This can be a severe disadvantage if the call that is dropped or fails to complete is an emergency communication.

SUMMARY

One drawback of many wireless systems is that no provision is made for assigning special priority to emergency dispatch calls, for example, voice communications to/from police, fire departments or other authorities using a half-duplex PTT service. Without any special priority assigned to emergency dispatch calls they are sometimes not completed or subject to being dropped from time to time just the same as other communications which may not be as urgent. Various embodiments disclosed herein address the above stated needs by making it possible to assign a special priority—dispatch priority—to communications associated with an emergency or urgent situation dispatch calls, including communications to/from the police, fire department or other authorities.

Various embodiments involve apparatus and methods of wirelessly communicating which include accepting an input that indicates an outgoing dispatch call is to be initiated, and then transmitting a connection request to initiate the call. The connection request includes an indication of dispatch priority. Once the connection request is received and verified at the system the call is accorded dispatch priority in order to be dispatch priority call. The dispatch priority gives the call precedence of all existing non-dispatch priority calls. In completing the call the system may determine whether there are enough open channels to complete the dispatch priority call to a recipient access terminal. If not enough channels are available to complete the call to the one or more recipients, the system may tear down a sufficient number of non-dispatch priority calls to complete the dispatch priority call.

BRIEF DESCRIPTION OF THE DRAWINGS

The accompanying drawings, which are incorporated in and constitute part of the specification, illustrate various embodiments of the invention, and, together with the general description, serve to explain the principles of the invention.

DETAILED DESCRIPTION

Aspects of the invention are disclosed in the following description and related drawings directed to specific embodiments of the invention. Alternate embodiments may be devised without departing from the scope of the invention. Additionally, some well known elements of the invention may not be described in detail or will be omitted so as not to obscure relevant details of the invention.

Throughout this detailed description the word "exemplary" is used to mean "serving as an example, instance, or illustration." Any embodiment described herein as "exemplary" is not necessarily to be construed as preferred or advantageous over other embodiments.

A high data rate (HDR) subscriber station, referred to herein as an access terminal (AT), may be mobile or stationary. An access terminal communicates with one or more HDR base stations, which may be referred to as modem pool transceivers (MPTs). An access terminal transmits and receives data packets through one or more modem pool transceivers to an HDR base station controller, referred to herein as a modem pool controller (MPC). Modem pool transceivers and modem pool controllers are parts of a network called an access network. An access network transports data packets between multiple access terminals. The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel. An access terminal may further be any of a number of types of devices including but not limited to PC card, compact flash, external or internal modem, or wireless or wireline phone. The communication link through which the access terminal sends signals to the modem pool transceiver is called a reverse link. The communication link through which a modem pool transceiver sends signals to an access terminal is called a forward link.

Figure 1:
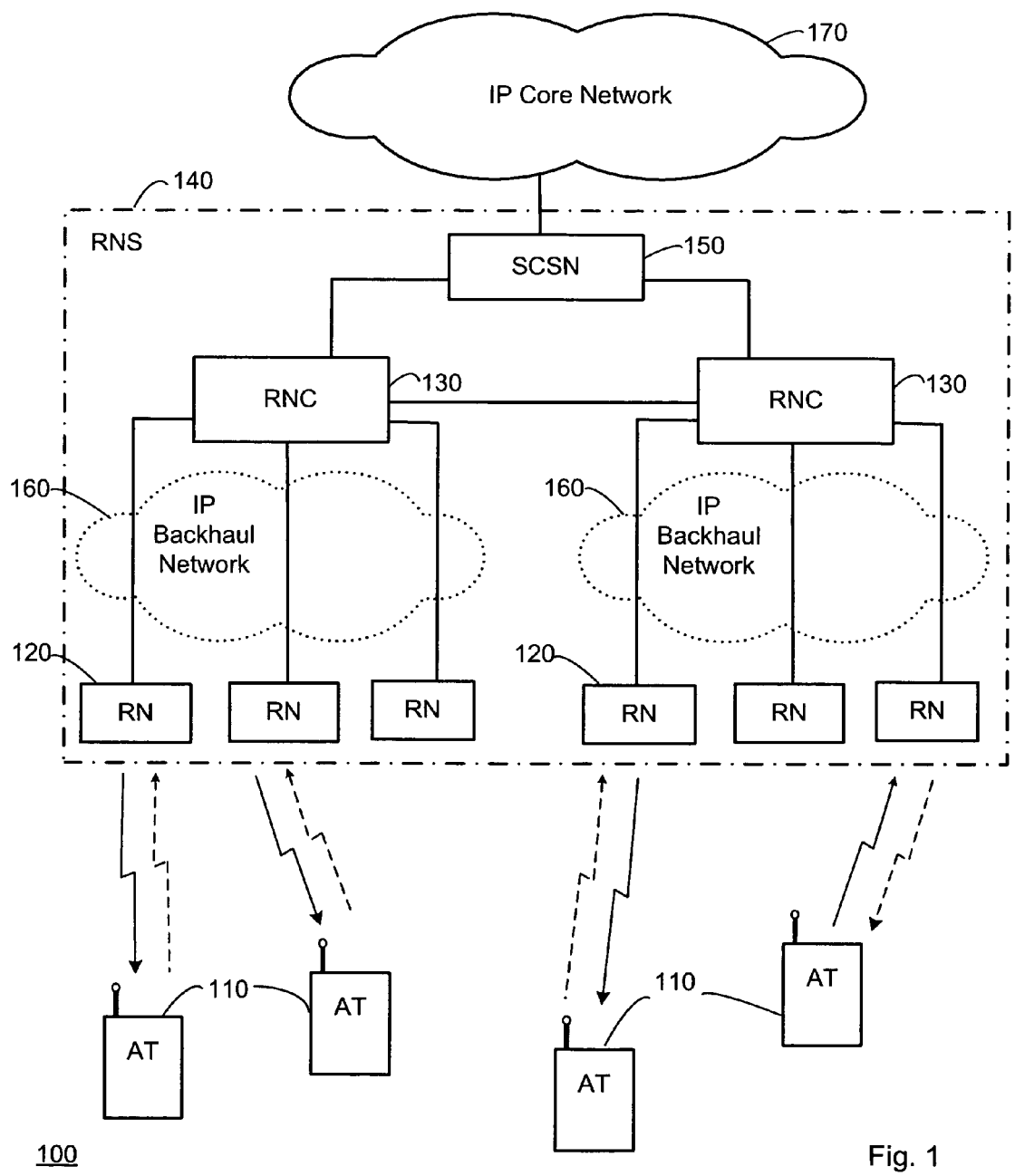
FIG. 1 depicts an exemplary wireless network architecture for use in accordance with the embodiments disclosed herein.

FIG. 1 depicts an exemplary wireless network architecture 100 that may be used in accordance with the embodiments disclosed herein. The system depicted may support a half-duplex PTT service, or may support full-duplex service such as cellular telephony or other wireless communication services. The system may be implemented in a CDMA2000 system which supports the 1xEV-DO specification. Some embodiments and variants may be implemented in other like wireless systems, such as the GSM system, for example, using W-CDMA. The system 100 may provide high speed wireless access to the Internet over an IP network, for example, using CDMA2000 1xEVDO technology. The system 100 typically includes the IP core network 170, one or more radio network subsystems (RNS 140), and access terminals (AT) 110. An "Access Network," as used herein, is the network equipment which provides data connectivity between a packet switched data network (e.g., network 170 or the Internet) and an AT 110. From the perspective of an AT 110, the system 100 connected to it by the air interface, including the RNS 140, may be considered the Access Network (AN). Hence, the AT 110 communicates wirelessly over an air interface (shown as arrows) to the AN. The solid-line arrows (one per each AT 110) signify one link for half duplex PTT communications. The additional dotted-line arrow for each AT 110 represents a second link for the AT 110 used for full duplex communications, e.g., for cellular telephone communications.

The RNS 140 includes one or more Radio Network Controllers (RNC 130), which, in turn, are each connected to one or more Radio Nodes (RN 120). The Serving GPRS Support Node (SGSN) 150 is the core network entity dealing with packet-switched connections. The SGSN 150 serves as a packet switch interface to the IP Core Network 170. In FIG. 1 the box depicting RN 120 typically includes a cell tower with one or more antennas, along with radio node receiver and transmitter electronics known to those of skill in the art for sending and receiving wireless signals. Depending upon the particulars of the implementation, the system 100 including RN 120, RNC 130, and AT 110, may take other forms or be referred to by other names. For example, instead of RN 120 some legacy systems may employ base stations, base station controllers/base transceiver station (BSC/BTS) or base station system (BSS). The RNC 130 may, in some legacy systems or other implementations, take other forms or be called other names, for example, a Mobile Switching Center (MSC). An MSC is the core network entity dealing with circuit-switched connections. The AT 10 may also be known by many different names, for example, user equipment, cellular telephones, mobile stations, wireless handsets, or the like. The scope of the invention covers these and other such systems, names, terms and implementations for the elements of various types of wireless systems.

The wireless network depicted in the figure is merely exemplary. Various embodiments may be implemented on any system that allows wireless communication between and among components, and may be connected in a manner such as the system 100 depicted in FIG. 1, or in another like manner. An AT 110 is a device which provides data connectivity to a user. An AT 110 may be embodied in the form of many different types of wireless devices, including for example, a cellular telephone, walkie talkie, wirelessly connected computer, PDA (personal digital assistant), pager, navigation device, music or video content download unit, wireless gaming device, inventory control unit, or other like types of devices communicating wirelessly via the air interface. Cellular or other wireless telecommunication services may communicate with a carrier network through a data link or other network link via the IP Core Network 170 which may include portions of the Internet, and may in turn, be connected to the Public Switched Telephone Network (PSTN), and/or one or more Integrated Services Digital Networks (ISDN), local area networks (LAN), wide area networks (WAN), or virtual private networks (VPN), or other such networks.

The wireless system 100 sends messages or other information, for example, in the form data packets via RNS 140 to or from AT 110. Whereas the RNs 120 are located at the cell site, the RNCs 130 are typically located at a central office. Each RNC 130 is connected to one or more RN 120 base stations. RNC 130 includes the logic (e.g., a processor or computer) to manage and control the wireless AT 110. The RNC 130 manages and controls functions such as call routing, registration, authentication, terminal-level security, location updating, handovers and/or encoding schemes for the wireless AT 110 registered at an RN 120 associated with the RNC 130. The RNC 130 is connected to the RNs 120 by a network configured for data transfer, generally via an IP backhaul network 160 which is a network of fixed communication lines operating in a manner similar to the interconnection of IP core network 170.

The wireless system 100 may include a Home Location Register (HLR) and a number of Visitor Location Registers (VLRs) for call-routing and roaming. A centralized HLR typically contains the administrative information for each AT 110 registered within the wireless system 100, along with the current location of the AT 110. The VLR stores selected administrative information from the centralized HLR for use in call control and the provisioning of the subscriber services for each AT 110 currently under control of the RNC 130. While the HLR is often centralized in one location within the wireless system 100, each RNC 130 typically has a VLR associated with it, often stored in a memory of the RNC 130. Other registers may be used for authentication and security in wireless network 110, for example, an Equipment Identity Register (EIR) and an Authentication Center (AuC). An indication that a particular AT 110 is assigned a special priority, for example, dispatch priority, may be stored in the HLR or the VLR at which other information about the AT 110 is stored.

The AT 110 may contain stored information which can be verified by the VLR or HLR for identification purposes. For example, in cellular telephony embodiments the AT 110 may be equipped with a Subscriber Identity Module (SIM), a smart card that identifies the AT 110 enabling it to make and receive calls at that terminal and receive other subscribed services. The AT 110 may have an International Mobile Equipment Identity (IMEI) stored on the SIM card which uniquely identifies that particular AT 110. The SIM card also has stored on it an International Mobile Subscriber Identity (IMSI) used to identify the subscriber to the system, along with a copy of the secret key from the AuC register for authentication, and other information pertaining to security, identification and communication protocols. In various embodiments the identification number of the AT 110 (e.g., the IMEI, IMSI or other identity information specific to the AT 110) may have a dispatch priority status associated with it so that call initiated from the AT 110 may be accorded dispatch priority. The identification number of the AT 110 may contain alphanumeric characters which are not necessarily numbers.

Communications to and from various RNC 130 and RN 120 elements can be carried out using IP transport technologies via the IP backhaul network 160 which consists of landlines and may include portions of the Internet, backbone circuits, and/or the PSTN. Upstream, the RNC 130 may be connected, via the IP Core Network 170, to multiple networks, such as those mentioned above, e.g., PSTN, public Internet, ISDN, etc., thus allowing client AT 110 devices access to a broader communication network. Voice communications may be sent using voice over IP (VOIP) technology. In addition to voice transmissions, data may be transmitted to the client device via SMS or other OTA methods known in the art. The subsystem RNS 140, including the RNC 130, controls the radio links between the RN 120 and the AT 110. Each RN 120 has one or more transmitters and receivers to send and receive information to/from the AT 110.

RN 120 broadcasts data messages or other information wirelessly to AT 110 by over-the-air (OTA) methods known to those of ordinary skill in the art. The wireless signals between AT 110 and RN 120 may adhere to the PTT standards, or to 1xEV-DO standards such as C.S0024-0 v3.0 released May 30, 2002; C.S0024-0 v4.0 released Feb. 6, 2003; C.S0024-A v1.0 released May 25, 2004, each of which is incorporated by reference herein in its entirety. The wireless signals between AT 110 and RN 120 may also adhere to variants of PTT standards or the aforementioned 1xEV-DO standards, for example, other versions and releases of the C.S0024 family that are compatible with CDMA2000 or other CDMA systems. In alternative embodiments, the wireless signals between AT 110 and RN 120 may be based on any of several different technologies, including but not limited to, CDMA, TDMA, FDMA, OFDM, or systems using a hybrid of coding technologies such as GSM, or other like wireless protocols used in communications or data networks.

To establish communications each AT 110 may be configured to monitor a control channel used to exchange messages with the RN 120 with which the AT 110 is registered. System maintenance and overhead messages are transmitted on control channels, and traffic channels are used for communications content such as voice and data payloads. Control channels may be used to establish traffic channels, control power levels, and generally control the communications between RN 120 and AT 110.

Figure 2:
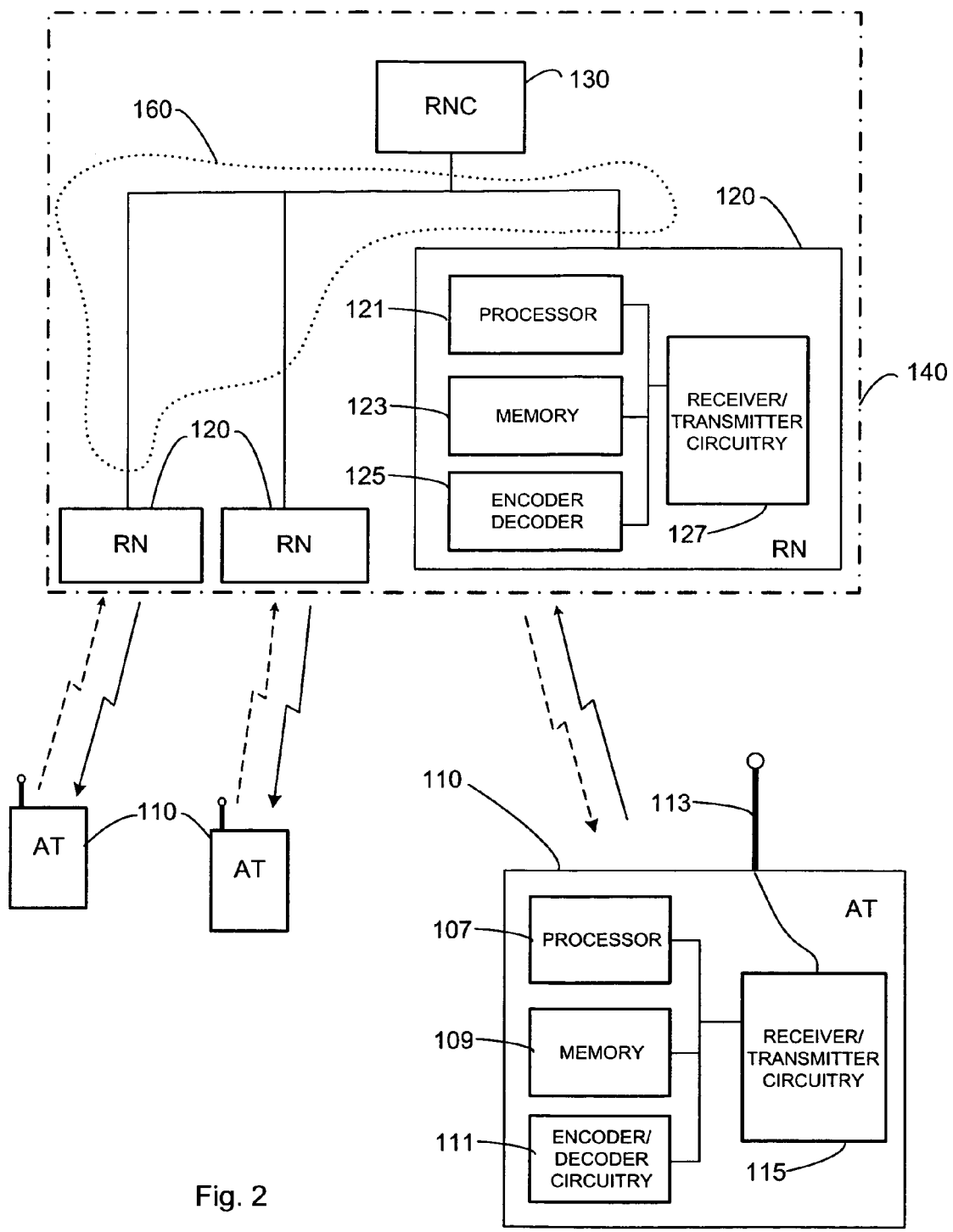
FIG. 2 depicts some details of an exemplary access terminal and a radio node.

FIG. 2 depicts some details of an exemplary access terminal, AT 110, and radio node, RN 120. RN 120 includes an encoder/decoder 125 which encodes information to be transmitted and decodes received information in the appropriate coding protocol or scheme. RN 120 includes receiver/transmitter circuitry 127 for wirelessly receiving packets from the AT 110, and for transmitting packets to the RNC 130 (which may be transmitted via a landline). RN 120 also includes a processor 121 which contains circuitry or other logic capable of performing or controlling the processes and activities involved in wireless communications, and in particular, the processes or activities set forth herein. For example, the processor 121 may include logic organized to recognize that a particular AT 120 is to be afforded dispatch priority.

RN 120 may include a memory 123 for storing the various protocols, routines, processes or software used in wireless communications. For example, the memory 123 may store one or more transmission, schemes, protocols or strategies for communicating with an AT 110. This information may also be stored in memory 108 of the RNC 130, and communicated to the RN 120 as needed or while performing periodic updates and system maintenance. Embodiments of AT 110, as shown in FIG. 2, typically include a processor or other logic 107, memory 109 and encoder/decoder circuitry 111 which perform functions similar to those of the corresponding parts of RN 120. For example, the encoder circuitry 111, or other like circuitry of the AT 110, is configured to encode or otherwise encapsulate data into a packet for transmission to RN 120. The processor 107 of AT 110 may be configured in the form of one or more processing circuits executing resident configured logic, a microprocessor, a digital signal processor (DSP), a microcontroller, or a combination of these or other like types of logic hardware, software and/or firmware configured to at least perform the operations described herein. Each AT 110 also has an antenna 113, receiver/transmitter circuitry 115 and other electronics known to those of ordinary skill in the art for wirelessly receiving and transmitting information. An AT 110 often has installed on it, or otherwise downloads, one or more software applications, such as games, news, stock monitors, and the like.

The recently introduced 1xEV-DO system is a wireless system which may be configured for half-duplex or full duplex voice communications. The 1xEV-DO standard is a data-optimized variant of the 1xEV-DV standard ("1xEV-DO" stands for 1x Evolution-Data Optimized). Although 1xEV-DO is optimized for data transport, the "data" channel may also be used for voice communication by transmitting packetized voice data. Some systems may use Voice Over Internet Protocol (VoIP) to transmit data encoded with voice information. The 1xEV-DO standard—sometimes referred to as IS-856, HRDP (High Rate Packet Data) or CDMA-DO—is compatible with existing CDMA networks such as CDMA2000 systems. This allows 1xEV-DO to be implemented without necessarily requiring entirely new hardware and/or software. Operators may upgrade their systems to offer advanced data services in a cost effective, efficient manner by using 1xEV-DO.

Another technology, WCDMA, is a 3G technology that uses the CDMA air interface rather than TDMA, thus increasing the data transmission rates of GSM systems. WCDMA is used in the 3G UMTS system (Universal Mobile Telecommunications System) for broadband voice, data and video at rates of up to 2 Mbit s/sec. WCDMA, which is specified by the ITU's IMT-2000 3G specification, is also known as the Direct Sequence (DS) mode.

Presently, data transmission technologies such as 1xEV-DO assign a "message priority" to packets of a communication based on efficiency and fairness considerations of the access network. The message priority is assigned in order to maximize throughput while at the same time balancing a fairness criteria between all the different ATs 110 engaged in communications. In one scheme a higher message priority is given to the AT that is first in time in initiating its communication. Aside from message priority which may be assigned to any system user, there is no provision made in conventional wireless systems to assign any sort of special priority for emergency dispatch calls; e.g., half-duplex PTT calls. Without any special priority assignment, emergency dispatch calls are just as likely as ordinary calls to be either dropped or fail to be initially completed. Various embodiments disclosed herein address the above stated needs by making it possible to assign a special priority—"dispatch priority"—to communications associated with an emergency calls, or communications to/from the police, fire department or other authorities.

For the purposes of this disclosure, the term "priority" used by itself in any other standard or specification (e.g., 3GPP2 C.S0024) shall mean "message priority" or other type of priority, but not "dispatch priority." The term "dispatch priority" is defined herein as a special priority assigned to messages to or from dispatch authorities (e.g., police and fire departments). A message with dispatch priority has priority over messages without dispatch priority for the purposes of completing a connection and maintaining the links for an existing connection. Furthermore, a later-in-time message with dispatch priority has priority over earlier-in-time messages without dispatch priority. Dispatch authorities include police agencies, fire department, and other emergency authorities who may be called upon to respond to a 911 call or other emergency call. Depending upon the particulars of the implementation, the term dispatch priority may be more broadly defined to include various military and/or governmental agencies with a mandate to respond to emergency situations (e.g., National Security Agency (NSA), National Guard, Coast Guard, FBI, CIA, Homeland Security agencies, or other like security or emergency organizations). It should be noted that a call with dispatch priority may also have message priority associated with it. However, for the purposes of initiating or maintaining a dispatch priority call, the message priority of dispatch priority call is not considered as compared to the message priority of non-dispatch priority calls. That is, a dispatch priority call with low message priority still trumps a non-dispatch priority call with high message priority. In other embodiments, a "special priority" may be assigned to full duplex VoIP calls giving them priority over calls without special priority. These special priority calls may be used by governmental authorities (e.g., police and fire departments) or other authorized users to insure the completion of important calls and maintain the communication link once the call has been completed.

Figure 3:
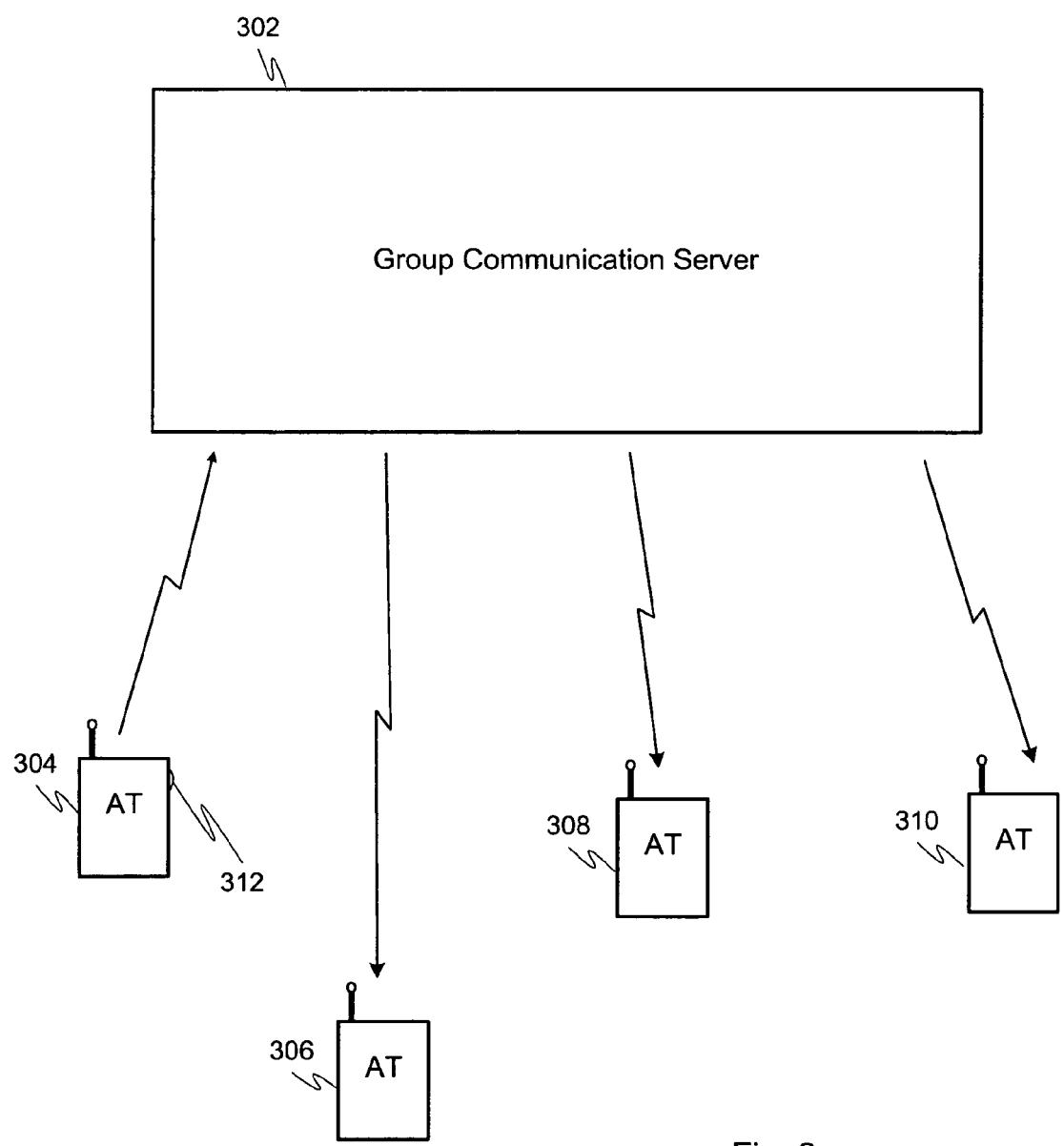
FIG. 3 depicts a block diagram of an exemplary push-to-talk system.

FIG. 3 depicts an exemplary push-to-talk system illustrating the interactions between the group communication server 302 and the PTT user access devices AT 304-310. Group communication systems, such as that shown in FIG. 3, may be called push-to-talk systems, dispatch systems, net broadcast services (NBS), point-to-multi-point communication systems, or other like terms. The group communication server 302 collectively represents the wireless system infrastructure between the air interface of the user access devices, ATs 304-310. For example, the group communication server 302 of FIG. 3 may include a number of the wireless system components shown in FIG. 1, such as the IP core network 170, one or more Radio Network Subsystems 140 which each have include a number of Radio Network Controllers 130 connected to one or more Radio Nodes 120. A more detailed description of PTT systems is provided in U.S. Pat. Nos. 6,781,963 and 6,477,150, both of which are assigned to Qualcomm, Inc. U.S. Pat. Nos. 6,781,963 and 6,477,150 are each hereby incorporated by reference herein in their respective entireties.

Since PTT operates using half duplex communications, FIG. 3 depicts only one communication link to or from each of the user access devices, ATs 304-310. At any given time the system allows only on PTT user access device within a connected PTT group to transmit while the remaining PTT user access devices listen. In FIG. 3 AT 304 is transmitting (as indicated by the uplink arrow) while the remaining user access devices in the predefined PTT group, ATs 306-310, are receiving. To initiate a transmission, a user depresses (or otherwise switches) a PTT button, shown on AT 304 as PTT button 312. The access device AT 304 transmits a connection request such as a PTT channel request to the group communication server 302. Upon receiving a PTT channel request from one of the user access devices, the group communication server 302 determines whether there are a sufficient number of free channels (one per user) in the appropriate cells to connect the PTT user group. In some implementations the group communication server 302 is able to set up the PTT call even if fewer than all of the users in the PTT group are available or have access to an open channel. If sufficient resources are available, the group communication server 302 transmits a channel grant message to each available user in the PTT group.

Figure 5:
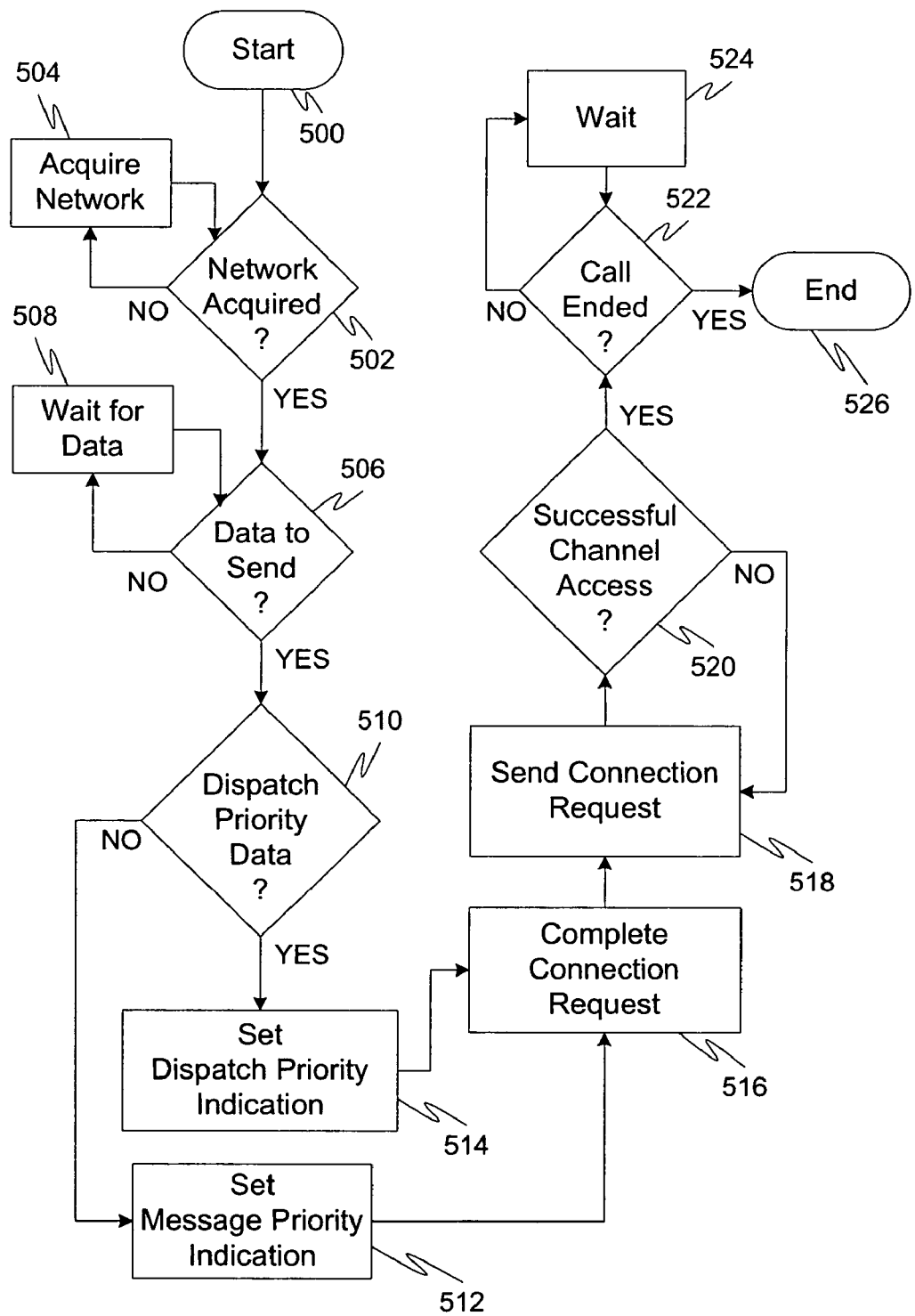
FIG. 5 is an exemplary method in accordance with various embodiments for completing a dispatch priority call in an access network.

Quite often PTT communications are used for emergency dispatch calls, for example, calls among police departments, fire departments, or other authorities, or possibly calls in response to 911 emergency calls. Problems may arise in connecting to a PTT group for an emergency call if there is no provision made to assign any sort of special priority for the emergency dispatch PTT call. Absent any sort of special priority assignment, emergency dispatch PTT groups are just as likely to either be dropped or fail to complete as ordinary PTT calls. In accordance with the embodiments disclosed herein, dispatch priority is assigned to the emergency dispatch PTT group. In this way the emergency dispatch PTT group will have priority of all non-emergency PTT groups in completing an emergency PTT call. FIG. 5 discloses a method for completing emergency wireless calls, including PTT calls, in further detail.

Figure 4A:
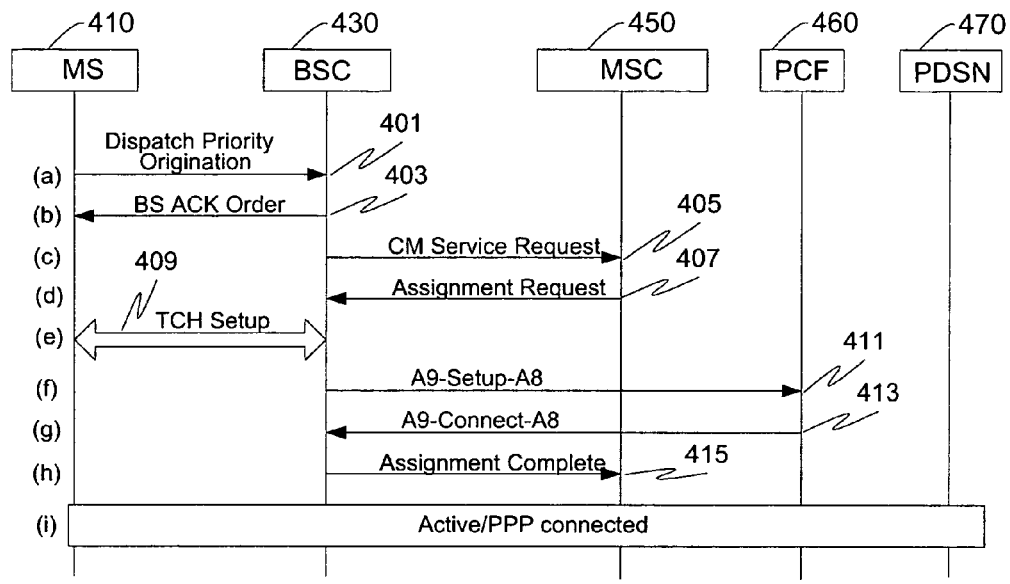
FIG. 4A depicts a call flow of a mobile originated call setup to establish a dispatch priority packet data call, in accordance with various embodiments.

FIG. 4A depicts a call flow for a mobile originated call setup in a legacy system to establish a dispatch priority packet data call. The system depicted in the figure includes a mobile station (MS 410), a base station controller (BSC 430), a Mobile Switching Center (MSC 450), a Packet Control Function (PCF 460) and a Packet Data Service Node (PDSN 470). Embodiments may be practiced in various legacy systems such as GSM systems, for example, with WCDMA implemented. Similar call setup activities may be performed in other systems, for example, the system depicted in FIG. 1. In order to implement the dispatch priority calling feature in WCDMA, a critical extension would be identified in the Radio Resource Control Connection Request message to indicate that the request is from a dispatch priority user. The RNC 130 of FIG. 1 takes the necessary steps to ensure that resources are made available to accommodate the connection request.

Referring to FIG. 4A, in order to activate the dispatch priority packet data service, at (a) the MS 410 transmits to BSC 430 a Dispatch Priority Origination Request 401 with the dispatch priority proprietary service option over the access channel of the air interface. Typically, the Origination Request 401 requires layer 2 acknowledgment. The BSC 430 acknowledges the receipt of the Origination Message 401, for example, with Base Station Acknowledgment Order 403 to the MS 410 in step (b). The BSC 430 constructs the CM Service Request message 405, places it in the Complete Layer 3 Information message, and sends the CM Service Request message 405 to the MSC 450 in step (c) to notify the MSC 450 that a dispatch priority call request has been received. At (d) the MSC 450 sends an Assignment Request message 407 to the BSC 430 to request assignment of radio resources.

In various embodiments, the MSC 450 and the BSC 430 work together to ensure that resources are assigned to the dispatch priority call. In the case of a congested network, the MSC 450 may revoke resources from non-dispatch priority calls in order to accommodate a dispatch priority call. In addition, the BSC 430 may need to signal the packet control function PCF 460 and packet data serving node PDSN 470 to inform them that the data channel request is for a dispatch priority call, thus ensuring the PDSN 470 makes resources available to accommodate the call (e.g., Internet Protocol (IP) address and Point-to-Point Protocol (PPP) session). At step (e) of FIG. 4A the BSC 430 and MS 410 initiate the establishment of radio traffic channel 409. In step (f), the BSC 430 transmits an A9-Setup-A8 message 411 to the PCF 460 with Data Ready Indicator set to 1 to establish an A8 connection 413 in (g). The PCF 460 responds to the BSC 430 A8 connection setup request by sending A9-Connect-A8 Message with Cause Value set to "Successful Operation." Upon receiving an A9-Connect-A8 message, BSC 430 transmits Assignment Complete 415 message to the MSC 450 in step (h).

Figure 4B:
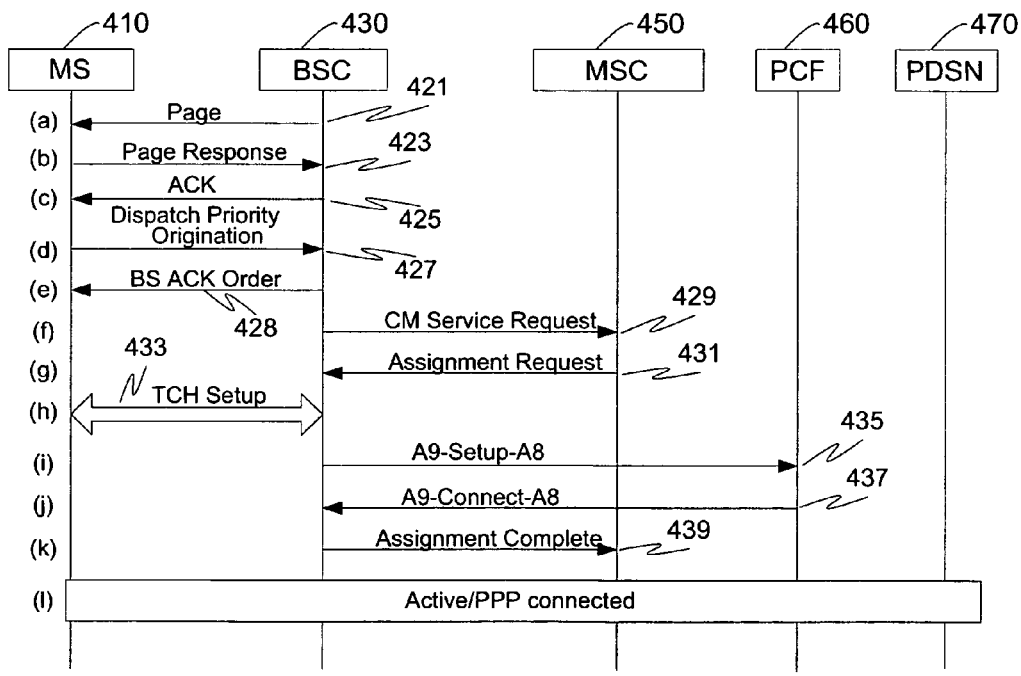
FIG. 4B depicts a call flow of a mobile terminated call setup to establish a dispatch priority packet data call, in accordance with various embodiments.

FIG. 4B depicts a call flow for a mobile terminated call setup to establish a dispatch priority packet data call, in accordance with various embodiments. Many of the activities in the mobile terminated call setup are similar to those of the mobile originated call setup depicted in FIG. 4A, except in the mobile terminated call setup the BSC 430 sends a page 421 at (a) to the MS 410 with a proprietary service option notifying the MS 410 of an incoming dispatch priority call. At (b) the MS 410 responds with page response 423, and at (c) the BSC 430 sends an acknowledgement 425. The MS 410 initiates a traffic channel request at (d) using a dispatch priority data service option in Dispatch Priority Origination Request 427. Depending upon the availability of resources for completing the call, the MS 410 may terminate any other services/applications that are currently active on the MS 410 in order to accommodate the incoming dispatch priority call, and initiate the origination request 427 using the proprietary service option.

The BSC 430 acknowledges the receipt of the Origination Message 427 with Base Station Acknowledgment Order 428 to the MS 410 in step (e). The BSC 430 constructs and sends the CM Service Request message 429 to the MSC 450 in step (f), notifying the MSC 450 that a dispatch priority call request has been received. At (g) the MSC 450 responds with an Assignment Request message 431 to BSC 430 requesting that radio resources be assigned. At (h) the BSC 430 and MS 410 establish radio traffic channel 433. In step (i) the BSC 430 transmits an A9-Setup-A8 message 435 to the PCF 460 with Data Ready Indicator set to 1 to establish an A8 connection. The PCF 460 responds to the BSC 430 A8 connection setup request 435 by sending A9-Connect-A8 Message 437 with Cause Value set to "Successful Operation." Upon receiving an A9-Connect-A8 message, BSC 430 transmits Assignment Complete 439 message to the MSC 450 in step (k).

FIG. 5 is an exemplary method in accordance with various embodiments for completing a dispatch priority call in an access network, for example, the access networks depicted in FIGS. 1-3. Although FIG. 5 discusses the call being initiated from an access terminal, AT 110, in various embodiments the call may alternatively be initiated from a the RNS 140 or from a landline telephone and completed through to one or more AT110s. The method begins at 500 and progresses to 502 where it is determined whether a network has been acquired by the AT for wirelessly communicating. The network may be an access network 100 as depicted in FIG. 1, in which an access terminal such as AT 110 may wirelessly communicate. If no network has been acquired the method proceeds along the "NO" branch to 504 to acquire a network, and then loops back to 502.

Once a network has been acquired in 502 the method proceeds along the "YES" branch to 506 where it is determined whether there is data to send. The data may be encoded voice data, text data, image data, or other types of data which may be sent in a wireless communication system. The data may be in packet form for transmission, for example, in accordance with 1xEV-DO or other such standards. In some embodiments the signals may be analog wireless signals. If, in 506, it is determined that there is no data to transmit, the method proceeds in accordance with the "NO" branch to 508 to wait for data, and then loops back to 506 again. If, in 506, it is determined that there is data to send, the method proceeds along the "YES" branch to 510 to determine whether the message is to be handled as a dispatch priority message. Determining whether or not a call is to be accorded dispatch priority may be achieved in a number of ways. For example, the hardware or memory of the handset itself, AT 110, typically has a stored identification number (e.g., IMEI, IMSI or other identification number). The identification number may have a status of dispatch priority associated with it which can be verified in an HLR, VLR or other database of parameters within the system (e.g., RNS 140). Alternatively, the user may indicate that dispatch priority is to be accorded the call by entering a code into the AT 110, or toggling a switch designated for such a purpose. In some embodiments, an authorized dispatch priority code may be entered into any telephone to accord dispatch priority for initiation of the call.

If, in 510, it is determined that the message is not to be assigned dispatch priority, the method proceeds along the "NO" branch to 512 where the message priority for the message is determined. Message priority is assigned to packets of a communication based on fairness considerations and throughput efficiency of the access network, not on the basis of the call being an emergency call. For each call which is set up, a message definition is created containing information regarding the treatment of the message, including the message priority for the non-dispatch priority communication, the channels on which the message can be transmitted, the addressing modes for the message, and whether the message requires signaling link protocol (SLP) reliable or SLP best-effort delivery. Once the message priority has been determined in 512 the method proceeds to 516 to complete the Connection Request (e.g., ConnectionRequest 602 of FIG. 6).

Figure 6:
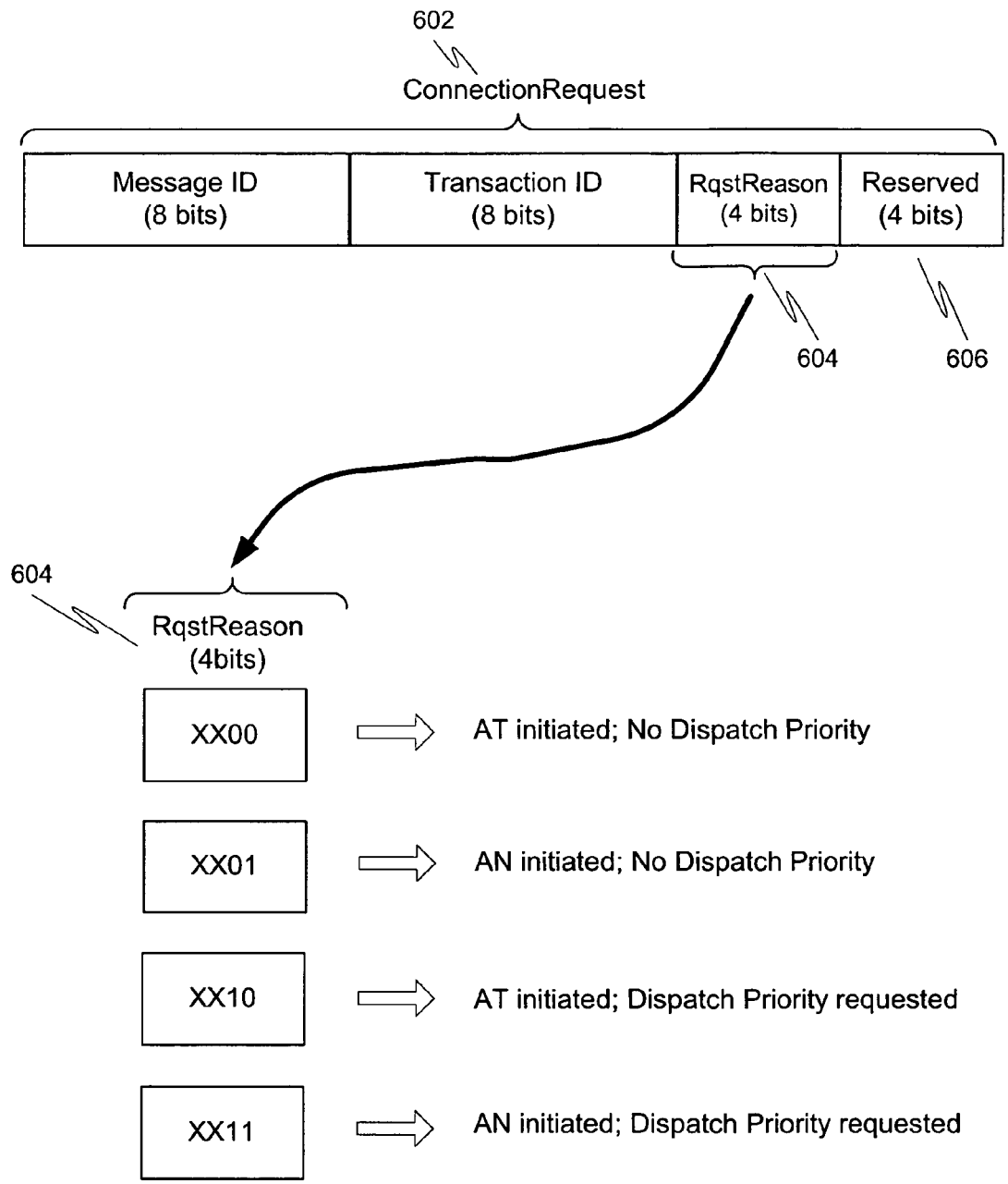
FIG. 6 depicts an exemplary embodiment of a connection request message requesting dispatch priority.

Back in 510, if it is determined that the message is not to be assigned dispatch priority, the method proceeds along the "YES" branch to 514 where a dispatch priority indication is set in a packet to be sent from AT 110 to RN 120, for example, the ConnectionRequest packet. In some embodiments the dispatch priority indication may be implemented in the RequestReason field 604 of ConnectionRequest 602, as shown in FIG. 6. The RequestReason field 604 consists of four bits. In conventional systems only one of the four RequestReason bits is used, the least significant bit towards the right, which is used to indicate either an Access Terminal Initiated message ("0") or an Access Network Initiated message ("1"). It is proposed herein that RequestReason field be overloaded to use a heretofore unused bit to indicate dispatch priority. In various embodiments herein it is proposed that the next bit (second from the right in the figure), be used to indicate whether or not the message is a dispatch priority message. For example, the second bit in the RequestReason field 604 may be set to "1" as an indication that the message is a dispatch priority message, or may be set to "0" as an indication that the message is not a dispatch priority message. In this embodiment the two most significant bits to the left remain unused, as indicated by the "X" label which may be treated as a don't care function.

Alternatively, other bits within the ConnectionRequest, or within other messages, may be used in a similar manner to indicate dispatch priority. For example, the ConnectionRequest message contains four reserved bits 606. One or more of these four reserved bits may be used to indicate dispatch priority. Once the dispatch priority indication is set in block 514, either by using the RequestReason field 604 or another indication of dispatch priority such as a bit in a different overhead field, the method proceeds to 516.

In block 516 the ConnectionRequest, or other type of initial call setup message requesting a different wireless connection, is completed. Typically the information used in setting up a communication includes information about the message priority (that is, non-dispatch priority) or else information about the dispatch priority, the channels on which the message is to be transmitted, the addressing modes for the message, and whether the message requires signaling link protocol (SLP) reliable or SLP best-effort delivery (if a non-dispatch priority message). Dispatch priority messages are preferably handled with SLP reliable delivery rather than SLP best-effort delivery. Other data and procedures known to those of ordinary skill in the art for setting up a communication may be handled in block 516 as well.

Once the call setup message is completed in 516, the method proceeds to 518 where the call setup message (e.g., ConnectionRequest 602 of FIG. 6) is transmitted to the RN 120 at which the AT 110 is registered. In various embodiments a call with dispatch priority which is being set up takes precedence over other calls without dispatch priority. If there are not a sufficient number of open channels to complete the dispatch priority call to a recipient access terminal then other, non-dispatch priority calls may be torn down to free up the channels needed for the dispatch priority call. Since a dispatch priority call may take place in between a PTT group of several or many recipient access terminals, the process of completing a call may entail disconnecting a number of non-dispatch priority calls in one or more of different coverage regions, that is, connected to one or more different RN120s or RNC 130s. It should be noted that from time to time some of the members of a PTT group may not be available to receive a call. For example, users sometimes have their access terminals turned off or may be in a locale which does not receive wireless signals. In such cases, the dispatch priority call may be completed to the available ones of the PTT group without requiring that all members of the group be available to receive the call. Upon sending the ConnectionRequest in 518 the method proceeds to 520 where it is determined whether the access channel was successfully granted.

If, in 520, it is determined that the access channel was not granted, the method proceeds along the "NO" branch back to 518 to resend the ConnectionRequest packet. If the channel being requested is for a dispatch priority message the ConnectionRequest may be resent a predetermined number of times, if necessary. However, it should not be necessary to resend a channel request for a dispatch priority message since such a message would take priority over non-dispatch priority messages and "bump" them out of the way to complete the call. In some embodiments, the non-dispatch priority call having lowest message priority may be dropped in order to assign a channel in response to a dispatch priority ConnectionRequest. In other embodiments the non-dispatch priority call having best connection parameters (e.g., signal strength) may be dropped in order to assign a channel in response to a dispatch priority ConnectionRequest. On the other hand, an existing dispatch priority call should never be dropped to grant a channel request to complete a non-dispatch priority call. Further, if the channel condition deteriorates to the point where a dispatch priority message is at risk of being dropped, in some embodiments a non-dispatch priority message occupying a channel with good reception characteristics may be dropped to turn the good channel over to the dispatch priority channel.

In 520 if the access channel has been successfully granted, the method proceeds in accordance with the "YES" branch to 522 to determine whether the call has ended. If, in 522 it is determined the communication has not yet ended, the method proceeds along the "NO" branch to 524 to wait before looping back to 522 to again to check the status of the call. If, in 522, it is determined that the communication has ended, the method proceeds to 526 and ends. FIG. 5 depicts activities from the access terminal perspective in a method for assigning dispatch priority in sending data from an AT 110 to an access network of the RN 120 to which the AT 110 is registered. From the other perspective, that is, the perspective of the system, assigning dispatch priority to send data from RN 120 to AT 110 entails a complementary set of activities, with some minor variations. For example, as part of the call set up procedures, sending data from the access network to an access terminal generally involves determining or verifying whether the AT 110 is registered in the network and with a particular RN120. This may be considered a complementary activity to determining whether a network is acquired in block 502.

In addition to the systems disclosed above, the present invention may be implemented in numerous types of wireless systems, including, for example, CDMA, WCDMA, CDMA2000, TD-SCDMA, and other wireless protocols such as TDMA and UMTS. The communication device, access terminal or handset may be a mobile telephone made by Kyocera, Samsung, or other manufacturer that uses CDMA technology and CDMA over-the-air (OTA) communication air interface protocols. Such protocols are defined in, but not limited to, IS-95A, IS-95B, UCDMA, IS-2000, and other specifications. The wireless communication systems which may be used to implement the present invention may include the Personal Communications Service (PCS) and various cellular systems, including, for example, the Analog Advanced Mobile Phone System (AMPS) and digital systems using encoding schemes such as CDMA, TDMA, and hybrid systems like GSM that use both TDMA and CDMA technologies. A description of a CDMA cellular system is found in the IS-95 Standard published by the Telecommunications Industry Association/Electronic Industries Association (TIA/EIA). The TIA/EIA's IS-98 Standard describes a combined AMPS/CDMA system. The WCDMA and CDMA2000 1x and 3x systems are described in the IMT-2000/UM specification published by the International Mobile Telecommunications System 2000/Universal Mobile Telecommunications Systems. The present invention may apply to wireless communication devices that are compatible with, and operate in, any one or more of these systems, including by not limited to wireless handsets, wireless telephones, cellular phones, data transceivers, paging devices, user terminals, mobile stations, mobile units, subscriber units, mobile radios, pocket bells, radiotelephones, wireless units and/or position determination units. The present invention applies to data modules or modems used to transfer voice and/or data information including digitized video information, and may communicate with other devices using wired or wireless links.

The figures are provided to explain and enable the invention and to illustrate the principles of the invention. Some of the activities for practicing the invention shown in the method block diagrams of the figures may be performed in an order other than that shown in the figures. For example, in FIG. 5 the determination of message priority (512) may take place at the same time as the determination of whether the message is to be accorded dispatch priority (510). Further, those of ordinary skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, circuits, activities, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of methods or steps of algorithms described in connection with the embodiments disclosed herein may be embodied directly in hardware, in a software module executed by a processor, in firmware, or in a combination of these. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person of ordinary skill in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of wirelessly communicating comprising:
accepting an input indicating that a call to a push-to-talk (PTT) group is to be initiated at an access terminal;
transmitting a connection request to initiate the call, wherein the connection request includes an indication that the call is to be a dispatch priority call, wherein the dispatch priority call has priority over messages without dispatch priority for the purposes of completing a connection and maintaining the links for an existing connection;
tearing down one or more non-dispatch priority calls to free up needed channels for the dispatch priority call; and
completing the dispatch priority call without requiring that all members of the PTT calling group are available to receive the call.

2. The method described in claim 1, wherein the connection request includes an indication of dispatch priority.

3. The method described in claim 1, further comprising: verifying that the call is to be accorded dispatch priority.

4. The method described in claim 1, wherein the dispatch priority call has an indication of message priority associated with it.

5. The method described in claim 1, wherein at least one non-dispatch priority call has a message priority.

6. The method described in claim 1, further comprising:
determining, in response to the connection request, whether there are enough open channels to complete the dispatch priority call to a recipient access terminal.

7. The method described in claim 6, further comprising: tearing down one or more non-dispatch priority calls to complete the dispatch priority call.

8. The method described in claim 1, wherein the dispatch priority call is to be connected to a plurality of recipient access terminals.

9. The method described in claim 1, wherein the access terminal is a wireless access terminal.

10. The method described in claim 1, wherein the access terminal is a landline terminal and the dispatch priority call is initiated from a landline to a plurality of recipient access terminals that are members of a PTT group.

11. The method described in claim 3, wherein the operation of verifying further comprises:
determining whether an identification of the access terminal initiating the dispatch priority call may be accorded dispatch priority status.

12. An access terminal comprising:
a processor; and
memory coupled to the processor, the memory having stored therein instructions, said instructions, when executed on the processor, causing the processor to perform operations comprising:
receiving incoming calls;
accepting a connection request indicating that a dispatch priority call to a push-to-talk (PTT) group is to be initiated at the access terminal;
requesting a dispatch priority for the dispatch priority call as part of the connection request;
transmitting a connection request to initiate the dispatch priority call, wherein the dispatch priority call has priority over a non-dispatch priority call for the purposes of completing a connection and maintain in the links for an existing connection;

tearing down one or more non-dispatch priority calls to free up needed channels for the dispatch priority call; and completing the dispatch priority call without requiring that all members of the PTT calling group are available to receive the call.

13. The access terminal of claim 12, further comprising:
a PTT button;
wherein the access terminal is configured to communicate via the dispatch priority call with a plurality of other access terminals that are members of a PTT group upon receiving an indication that the PTT button has been depressed or switched.

14. The access terminal of claim 12, further comprising:
a memory configured to store an access terminal identification number that is associated with a dispatch priority status.

15. A radio node comprising:
a processor;
a computer readable storage medium including instructions, said instructions coupled to the processor, said instructions, when executed on the processor, causing the processor to perform operations comprising:
receiving incoming messages and transmitting outgoing messages;
receiving a call to a push-to-talk (PTT) group as part of a connection request from an access terminal;
affording said access terminal priority over all other non-dispatch priority calls; and
completing the call without requiring that all members of the PTT calling group are available to receive the call.

16. The radio node described in claim 15, wherein, in response to the call one or more non-dispatch priority calls are torn down to complete the call from the access terminal.

17. A computer readable storage medium bearing computer readable instructions that, when executed on a processor, cause the processor to perform operations comprising:
receiving incoming messages and transmitting outgoing messages;
receiving a dispatch priority request to a push-to-talk (PTT) group as part of a connection request from an access terminal;
affording said access terminal priority over all other non-dispatch priority calls; and
completing the dispatch priority request without requiring that all members of the PTT calling group are available to receive the dispatch priority request.

18. The computer readable storage medium described in claim 15, further comprising instructions that, when executed on the processor cause the processor to perform operations comprising,
tearing down, in response to the connection request, one or more non-dispatch priority calls to complete the dispatch priority call from the access terminal.

19. A method for wireless communicating, comprising:
receiving incoming messages and transmitting outgoing messages;
receiving a dispatch priority request to a push-to-talk (PTT) group as part of a connection request from an access terminal;
affording said access terminal priority over all other non-dispatch priority calls; and
completing the dispatch priority request without requiring that all members of the PTT calling group are available to receive the dispatch priority request.

20. The method of claim 19, further comprising:
tearing down, in response to the connection request, one or more non-dispatch priority calls to complete the dispatch priority call from the access terminal.

21. A system for wireless communicating, comprising:
means for receiving incoming messages and transmitting outgoing messages;
means for receiving a dispatch priority request to a push-to-talk (PTT) group as part of a connection request from an access terminal;
means for affording said access terminal priority over all other non-dispatch priority calls; and
means for completing the dispatch priority request without requiring that all members of the PTT calling group are available to receive the dispatch priority request.

22. The system of claim 21, further comprising:
means for tearing down, in response to the connection request, one or more non-dispatch priority calls to complete the dispatch priority call from the access terminal.

23. A system for wirelessly communicating comprising:
means for accepting an input indicating that a call to a push-to-talk (PTT) group is to be initiated at an access terminal;
means for transmitting a connection request to initiate the call, wherein the connection request includes an indication that the call is to be a dispatch priority call, wherein the dispatch priority call has priority over messages without dispatch priority for the purposes of completing a connection and maintaining the links for an existing connection;
means for tearing down one or more non-dispatch priority calls to free up needed channels for the dispatch priority call; and
means for completing the dispatch priority call without requiring that all members of the PTT calling group are available to receive the call.

24. The system of claim 23, wherein the connection request includes an indication of dispatch priority.

25. The system of claim 23, further comprising:
means for verifying that the call is to be accorded dispatch priority.

26. The system of claim 23, wherein the dispatch priority call has an indication of message priority associated with it.

27. The system of claim 23, wherein at least one of the non-dispatch priority calls has a message priority.

28. The system of claim 23, further comprising:
means for determining, in response to the connection request, whether there are enough open channels to complete the dispatch priority call to a recipient access terminal.

29. The system of claim 28, further comprising:
means for tearing down one or more non-dispatch priority calls to complete the dispatch priority call.

30. The system of claim 23, wherein the dispatch priority call is to be connected to a plurality of recipient access terminals.

31. The system of claim 23, wherein the access terminal is a wireless access terminal.

32. The system of claim 23, wherein the access terminal is a landline terminal and the dispatch priority call is initiated from a landline to a plurality of recipient access terminals that are members of a PTT group.

33. The system of claim 25, wherein the means for verifying further comprises:
means for determining whether an identification of the access terminal initiating the dispatch priority call may be accorded dispatch priority status.

34. The system of claim 23, further comprising:
means for communicating via the dispatch priority call with a plurality of other access terminals that are members of a PTT group upon receiving an indication that a PTT button has been depressed or switched.

35. The system of claim 23, further comprising:
means for storing an access terminal identification number that is associated with a dispatch priority status.

36. The method of claim 1, further comprising:
communicating via the dispatch priority call with a plurality of other access terminals that are members of a PTT group upon receiving an indication that a PTT button has been depressed or switched.

37. The method of claim 1, further comprising:
storing an access terminal identification number that is associated with a dispatch priority status.

38. The access terminal of claim 12, wherein the connection request includes an indication of dispatch priority.

39. The access terminal of claim 12, wherein the memory further comprises instructions comprising:
verifying that the call is to be accorded dispatch priority.

40. The access terminal of claim 12, wherein the dispatch priority call has an indication of message priority associated with it.

41. The access terminal of claim 12, wherein at least one non-dispatch priority call has a message priority.

42. The access terminal of claim 12, wherein the memory further comprises instructions comprising:
determining, in response to the connection request, whether there are enough open channels to complete the dispatch priority call to a recipient access terminal.

43. The access terminal of claim 12, wherein the memory further comprises instructions comprising:
tearing down one or more non-dispatch priority calls to complete the dispatch priority call.

44. The access terminal of claim 12, wherein the dispatch priority call is to be connected to a plurality of recipient access terminals.

45. The access terminal of claim 12, wherein the access terminal is a wireless access terminal.

46. The access terminal of claim 12, wherein the access terminal is a landline terminal and the dispatch priority call is initiated from a landline to a plurality of recipient access terminals that are members of a PTT group.

47. The access terminal of claim 39, wherein the instructions for verifying further comprise instructions for:
determining whether an identification of the access terminal initiating the dispatch priority call may be accorded dispatch priority status.

\* \* \* \* \*